(12) United States Patent
Levi et al.

(10) Patent No.: US 10,922,217 B1
(45) Date of Patent: Feb. 16, 2021

(54) ADAPTIVE REGRESSION TESTING

(71) Applicant: APPLIED MATERIALS ISRAEL LTD., Rehovot (IL)

(72) Inventors: Elad Levi, Rehovot (IL); Moshe Herskovits, Rehovot (IL); Arie Kagan, Rehovot (IL); Marina Pugach, Rehovot (IL); Daniela Radomislsky, Rehovot (IL)

(73) Assignee: APPLIED MATERIALS ISRAEL LTD., Rehovot (IL)

( * ) Notice: Subject to any disclaimer, the term of this patent is extended or adjusted under 35 U.S.C. 154(b) by 0 days.

(21) Appl. No.: 16/678,653

(22) Filed: Nov. 8, 2019

(51) Int. Cl.
*G06F 9/44* (2018.01)
*G06F 11/36* (2006.01)

(52) U.S. Cl.
CPC ...... *G06F 11/3688* (2013.01); *G06F 11/3684* (2013.01); *G06F 11/3692* (2013.01)

(58) Field of Classification Search
None
See application file for complete search history.

(56) References Cited

U.S. PATENT DOCUMENTS

| 8,276,123 | B1* | 9/2012 | Deng | G06F 11/368 717/125 |
| 2011/0219359 | A1* | 9/2011 | Gupta | G06F 9/44 717/124 |
| 2014/0351793 | A1* | 11/2014 | Bartley | G06F 11/3676 717/124 |

* cited by examiner

*Primary Examiner* — Qamrun Nahar
(74) *Attorney, Agent, or Firm* — Kilpatrick Townsend & Stockton LLP

(57) ABSTRACT

A method, non-transitory computer readable medium and a computerized system for adaptive regression testing. The method may include (a) generating or receiving monitoring results that are indicative of relevant data segments and relevant source code segments; (b) generating, based on the monitoring results, a first mapping that maps test cases of the multiple test cases to at least some of the relevant data segments; (c) detecting detected data changes introduced during a monitoring period that follows the execution of the regression tests; (d) selecting, based on the detected data changes and the first mapping, one or more selected test cases for evaluating an impact of the detected data changes; and (e) evaluating the impact of the detected data changes by executing the one or more selected test changes.

12 Claims, 2 Drawing Sheets

ADAPTIVE REGRESSION TESTING

BACKGROUND OF THE INVENTION

As software is updated or changed, or reused on a modified target, emergence of new faults and/or re-emergence of old faults is quite common. Sometimes re-emergence occurs because a fix gets lost through poor revision control practices (or simple human error in revision control). Often, a fix for a problem will be "fragile" in that it fixes the problem in the narrow case where it was first observed but not in more general cases which may arise over the lifetime of the software. Frequently, a fix for a problem in one area inadvertently causes a software bug in another area. Finally, it may happen that, when some feature is redesigned, some of the same mistakes that were made in the original implementation of the feature are made in the redesign (See: www.wikipedia.org).

Therefore, in most software development situations, it is considered good coding practice, when a bug is located and fixed, to record a test that exposes the bug and re-run that test regularly after subsequent changes to the program. Although this may be done through manual testing procedures using programming techniques, it is often done using automated testing tools. Such a test suite contains software tools that allow the testing environment to execute all the regression test cases automatically; some projects even set up automated systems to re-run all regression tests at specified intervals and report any failures (which could imply a regression or an out-of-date test). Common strategies are to run such a system after every successful compile (for small projects), every night, or once a week. Those strategies can be automated by an external tool.

Regression testing includes re-running functional and non-functional tests to ensure that previously developed and tested software still performs after a code or hardware change. For example—changes that may require regression testing include bug fixes, software enhancements, configuration changes, and even substitution of electronic components. As regression test suites tend to grow with each found defect, test automation is frequently involved.

Regression testing is an integral part of the extreme programming software development method. In this method, design documents are replaced by extensive, repeatable, and automated testing of the entire software package throughout each stage of the software development process. Regression testing is done after functional testing has concluded, to verify that the other functionalities are working.

In the corporate world, regression testing has traditionally been performed by a software quality assurance team after the development team has completed work. However, defects found at this stage are most costly to fix. This problem is being addressed by the rise of unit testing. Although developers have always written test cases as part of the development cycle, these test cases have generally been either functional tests or unit tests that verify only intended outcomes. Developer testing compels a developer to focus on unit testing and to include both positive and negative test cases.

Due to the expensive nature of "retest all" technique, Regression Test Selection should be performed. In this technique instead of rerunning the whole test suite—a selection of which part of a test suite to rerun.

Regression testing techniques are broadly classified into two categories:
a. Regression test selection: select part of the overall test suites that validates the new code.
b. Test case prioritization: order all the test cases in such a way that will yield the best success (e.g. detect bugs earlier in the process).

While regression testing is centered on code changes, it does not consider data changes—especially data changes that may be performed in a manner that bypasses the software development process. This problem is more significant in complex computerized systems in which many entities may perform data changes—especially data changes that affect the behavior of the source code.

There is a growing need to provide regression testing techniques that are responsive to data changes.

BRIEF SUMMARY OF THE INVENTION

There may be provided a method, non-transitory computer readable medium and a computerized system for adaptive regression testing. The method may include (a) generating or receiving monitoring results that are indicative of relevant data segments and relevant source code segments; (b) generating, based on the monitoring results, a first mapping that maps test cases of the multiple test cases to at least some of the relevant data segments; (c) detecting detected data changes introduced during a monitoring period that follows the execution of the regression tests; (d) selecting, based on the detected data changes and the first mapping, one or more selected test cases for evaluating an impact of the detected data changes; and (e) evaluating the impact of the detected data changes by executing the one or more selected test changes.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE INVENTION

Figure 1:
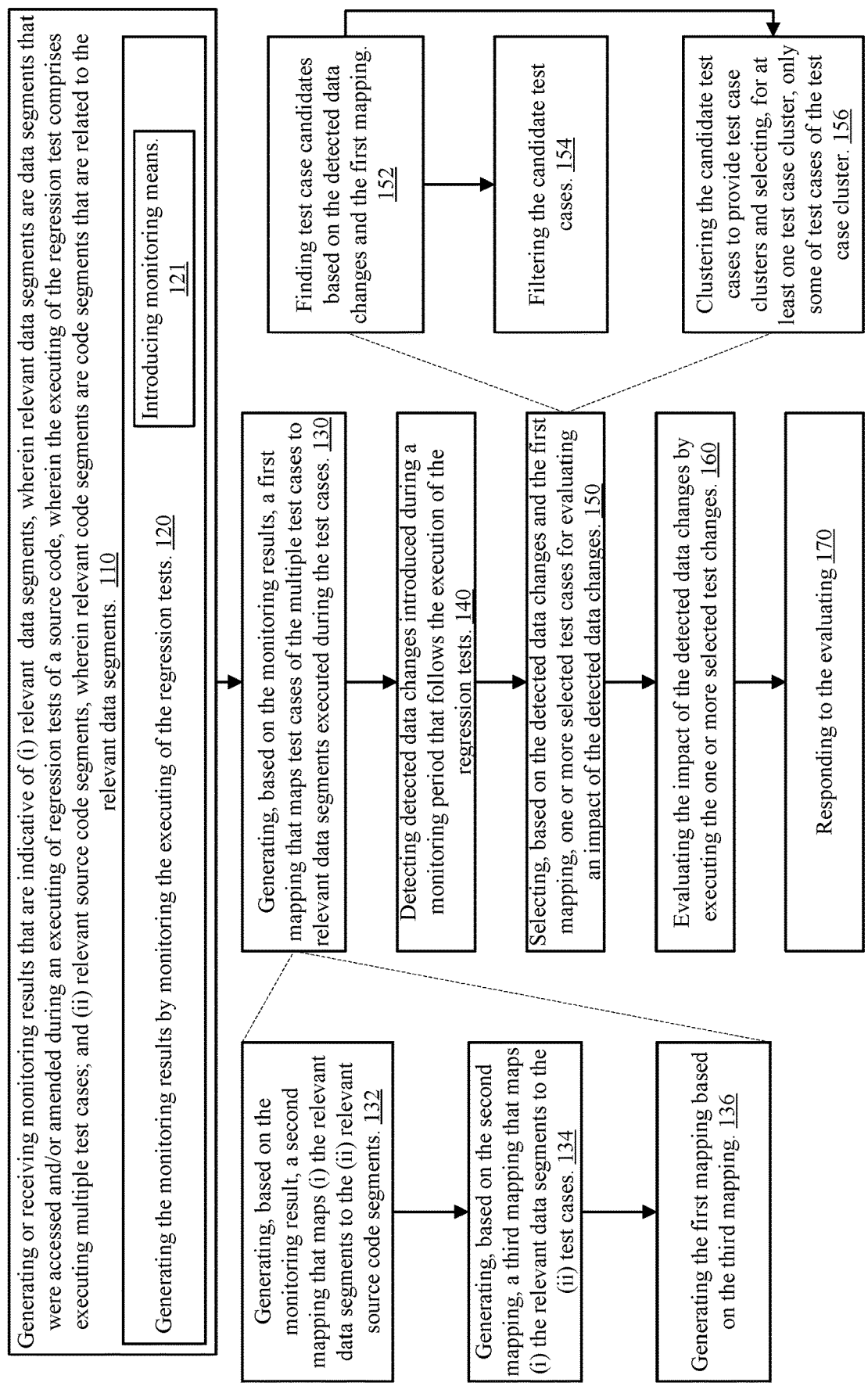
FIG. 1 illustrates an example of a method.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure Any reference in the specification to a method should be applied mutatis mutandis to a system capable of executing the method and should be applied mutatis mutandis to a computer readable medium that is non-transitory and stores instructions for executing the method.

Any reference in the specification to a system should be applied mutatis mutandis to a method that may be executed by the system and should be applied mutatis mutandis to a computer readable medium that is non-transitory and stores instructions executable by the system.

Any reference in the specification to a computer readable medium that is non-transitory should be applied mutatis mutandis to a method that may be applied when executing instructions stored in the computer readable medium and should be applied mutatis mutandis to a system configured to execute the instructions stored in the computer readable medium.

The term "and/or" means additionally or alternatively.

There is provided a system, a method, and a non-transitory computer readable medium for adaptive regression testing. The regression testing is adaptive in the sense that is selects test cases based, at least in part, on data changes.

FIG. 1 illustrates an example of method 100.

Method 100 may be executed by a computerized system that includes one or more processing circuits.

A processing circuit may be a hardware accelerator, a general purpose unit, a central processing unit (CPU), a system on chip (SOC), an image processor, a graphic processing unit (GPU), a field programmable gate array (FPGA), an application specific integrated circuit (ASIC), a neural network processor, and the like.

Method 100 may start by step 110 of (a) generating or receiving monitoring results.

The monitoring results are indicative of (i) relevant data segments and (ii) relevant source code segments.

Relevant data segments are data segments that were (a) accessed during an executing of regression tests of a source code, and additionally or alternatively, (b) amended during the executing of regression tests of a source code.

The executing of the regression test may include executing multiple test cases.

Relevant source code segments are source code segments that are related to the relevant data segments. For example—a source code segment that generated an access request for accessing a relevant data segment may be regarded as being related to the relevant data segment.

The source code may be executed by a system that may be a complex computerized system in which many entities may perform data changes. It should be noted that the source code may be executed by any other type of computerized systems—including a simple computerized system, a computerized system in which one or few entities may access data, and the like.

Non-limiting examples of complex computerized systems may include evaluation tools such as a metrology tool, an inspection tool, a review tool, a scanning electron microscope, a charged particle imager, an automatic optical inspection system, a testing farm that includes multiple tools, and like.

An example of a tool manufacturing company is Applied Materials INC. of Santa Clara, USA.

Non-limiting examples of data segments may include evaluation method parameters such as sensitivity, intensity, stop conditions, image brightness, polarization, duration of a test iteration, or any other parameters.

Other non-limiting examples of data segments may include files, file segments, parameters of an operating system, parameters of a database, environmental parameters, and the like.

Step 110 may include step 120 of generating the monitoring results by monitoring the executing of the regression tests. It should be noted that at least a part of the monitoring results may be received by a computerized system that executes method 100.

Step 120 may include step 121 of introducing monitoring means. Step 121 may include, for example, amending the source code to introduce data access monitoring hooks.

Step 110 may be followed by step 130 generating, based on the monitoring results, a first mapping that maps test cases of the multiple test cases to relevant data segments executed during the test cases. The multiple test cases (tested during the regression tests) may include at least one test case that is not mapped by the first mapping.

Step 130 may include at least one step out of steps 132, 134 and 136.

Step 132 may include generating, based on the monitoring result, a second mapping that maps (i) the relevant data segments to the (ii) relevant source code segments.

Step 132 may be followed by step 134 of generating, based on the second mapping, a third mapping that maps (i) the relevant data segments to the (ii) test cases.

Step 134 may be followed by step 136 of generating the first mapping based on the third mapping.

Step 130 may be followed by step 140 of detecting detected data changes introduced during a monitoring period that follows the execution of the regression tests.

Step 140 may be followed by step 150 of selecting, based on the detected data changes and the first mapping, one or more selected test cases for evaluating an impact of the detected data changes.

Step 150 may include at least one step of steps put of step 152, 154 and 156.

Step 152 may include finding test case candidates based on the detected data changes and the first mapping. The test case candidates may be all of the test cases mapped to all of the detected data changes, or may be only a part of all of the test cases mapped to the detected data changes.

The one or more selected test cases belong to the test case candidates.

Step 152 may be followed by step 154 of filtering the candidate test cases.

The filtering may be based on the consistency of test cases, or on any other parameter of the test cases.

For example, a test case may be deemed to be inconsistent (of oscillating) when different iterations of the test case yield in contradicting results (for example a failure that is followed by a success that is followed by another failure that is followed by another success, and the like). Inconsistent test cases may be regarded of having a lower value than consistent test cases.

A parameter of the test case may be, for example, a time required to complete the test case, computational resources required for a completion of the test case, memory resources required for a completion of the test case, sensitivity of the test case to data changes, and the like.

Step 152 may be followed by step 156 of clustering the candidate test cases to provide clusters and selecting, for at least one cluster, only some (one or more) of the candidate test cases of the cluster.

The clustering of step 156 may be based on use cases associated with the test cases.

The clustering of step 156 may be based on names of the candidate test cases. Thus—test cases having the same name or similar names may form a cluster. Name similarity may be determined based on any similarity measurement process—for example—letter similarity, locations of similar letters, location of dissimilar letters, and the like.

The clustering of step 156 may be based on code similarity of the candidate test cases. Thus—test cases having the same code or similar codes may form a cluster. Code similarity may be determined based on any similarity measurement process.

Step 150 may be followed by step 160 of evaluating the impact of the detected data changes by executing the one or more selected test changes.

The impact may include introduction of errors in the execution of the source code or impacting in any manner the outcome of an execution of the source code. For example—the impact may include changing the effectiveness of the source code, changing an accuracy of the outcome of execution of the source code, changing the time of execution of the source code, changing the resources required to execute the source code, and the like.

Step 160 may be followed by step 170 of responding to the evaluating.

Step 170 may include amending the source code, generating an indication regarding the impact of the detected data changes on the execution of the source code, suggesting to limit at least some of the data changes, forbidding or preventing certain data changes, amending the source code, rewriting at least one source code segment, amending at least one source code segment, adding at least one source code segment, removing at least one source code segment, enforcing access rules for limiting access (or limiting amendment) to one or more data segments, and the like.

An example of an implementation of method 100 is provided below.

It is assumed that program (source code P1) is provided and the program runs on a complex computerized system with different data providers. There is a known base line for data values. A data change (C1) is introduced in the testing farm.

The method may seek for a minimal set of test cases which verifies program P1 given C1.

Referring to FIG. 1—step 121 may include enriching program P1 with linking or hooking to a program resource data loading. E.g. in case of Java application—resource loader.

Do_best.java (line 42):
File file=New File(getClass( )
.getClassLoader( )
.getResource("database.properties")
.getFile( ));

This hook reports and logs all data access request from P1.

Referring to FIG. 1—step 110 may include generating monitoring results of an execution of a full regression test run or a partial regression test run. The regression test may be executed with code coverage mapping to create the second mapping for mapping relevant data segments to relevant code segments.

The second mapping (M2) may be a table with entries.

An example of the 17'th entry of M2 is illustrated in TABLE 1 below:

TABLE 1

| Id | Class Name | Function Name | Line Number | Data Item Type | Data Id |
|----|------------|---------------|-------------|----------------|---------|
| 17 | Do_best | printFile | 42 | File | database.properties |

Column Id is the number of row of M2. A source code segment is identified by a combination of columns "Class name", "Function Name" and "Line Number". A data segment is identified by a combination of columns "Data Item Type and "Data Id". Examples of data item types are files, database parameter, operating system parameter, and the like.

A third mapping (M3) between relevant data segments to test cases (test cases that once executed involve accessing or changing the data segments) can be generated.

The following example illustrates an intermediate mapping and the third mapping.

The intermediate mapping maps test cases to rows of the second mapping data structure. The intermediate mapping may be generated based on testing code coverage and the second mapping data structure. The intermediate mapping may have the following format:

TABLE 2

| Test Case | DAC Id |
|-----------|--------|
| Load_data_test.java | 17 |

The third mapping may have the following format:

TABLE 3

| Data Item Type | Data Item Type |
|----------------|----------------|
| File | database.properties |

Figure 2:
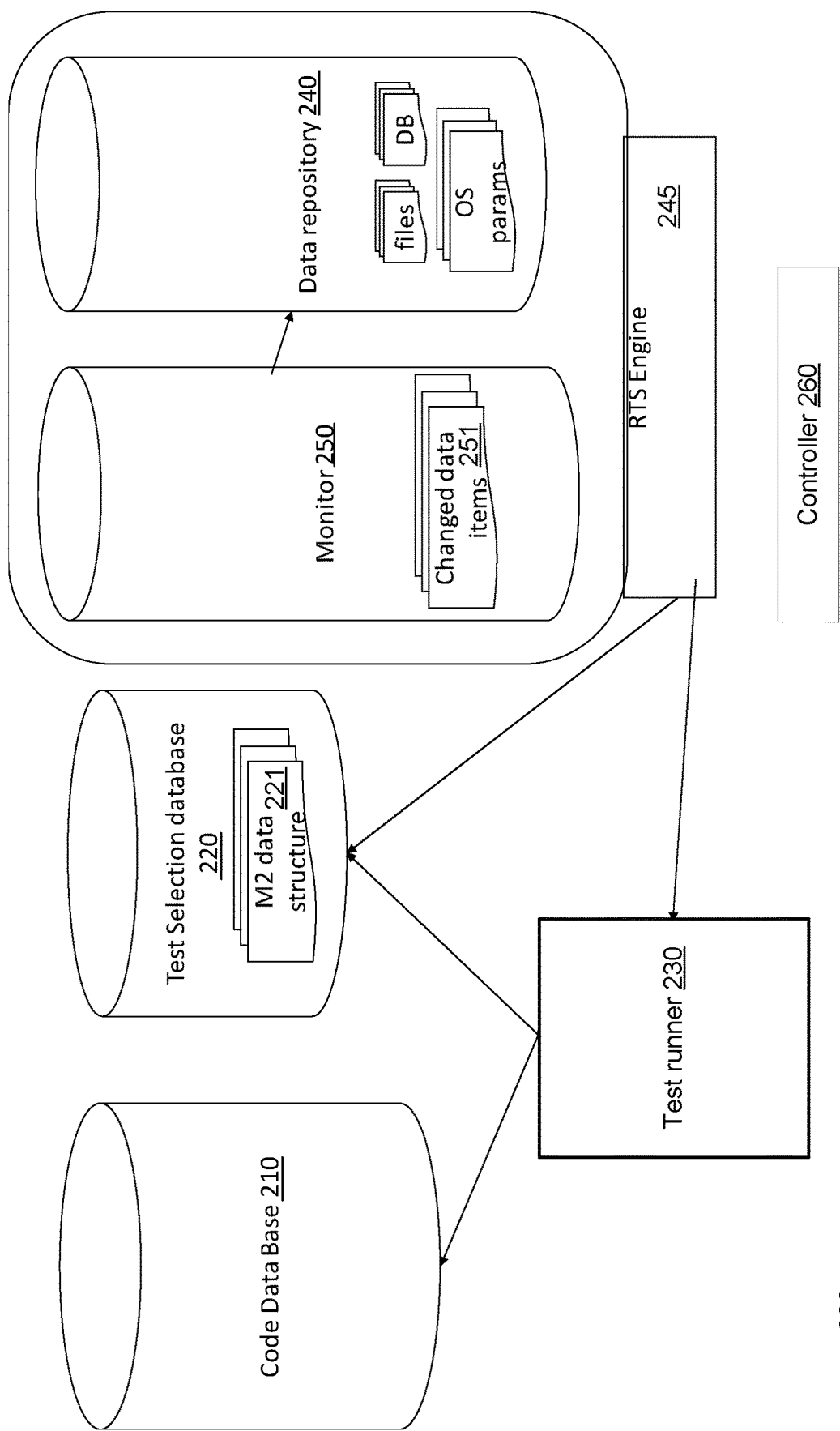
FIG. 2 illustrates an example of a system.

FIG. 2 illustrates an example of a computerized system 200.

Computerized system 200 may include one or more processing circuits, and memory modules.

The memory modules may be configured to store a code data base 210, a test selection database 220, and a data repository 240.

One or more of the memory modules may be configured to receive monitoring results that are indicative of (a) relevant data segments, wherein relevant data segments are data segments that were accessed during an execution of regression tests of a source code or amended during the execution of the regression tests, wherein the executing of the regression test comprises executing multiple test cases; and (b) relevant source code segments, wherein relevant code segments are code segments that are related to the relevant data segments.

The processing circuits may include, for example, test runner 230, regression test selection engine (RTS) 245, monitor 250 and controller 260.

Data repository 240 may be configured to store entities such as files, data base parameters, operating system parameters, and the like.

Monitor 250 may be configured to detect changes in the entities of the data repository 240 and may generate monitoring results.

The test runner 230 may be configured to run tests such as regression tests, selected test cases, and the like.

The code data base 210 may store a source code and hooks.

The test selection database 220 may store mapping data bases such as but not limited to a second mapping data base, a first mapping database, detected data changes, and the like.

RTS 245 may be configured to select, based on the detected data changes and the first mapping, one or more selected test cases for evaluating an impact of the detected data changes.

Controller 260 may generate any mapping mentioned in the specification. For example—the controller 260 may be configured to generate, based on the monitoring results, a first mapping that maps test cases of the multiple test cases to at least some of the relevant data segments.

The controller 260 may be configured to evaluate the impact of the detected data changes based on an execution the one or more selected test changes.

In the foregoing specification, the embodiments of the disclosure has been described with reference to specific examples of embodiments of the disclosure. It will, however, be evident that various modifications and changes may be made therein without departing from the broader spirit and scope of the embodiments of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

What is claimed is:

1. A method for adaptive regression testing, the method comprises:
  generating or receiving monitoring results that are indicative of: (i) relevant data segments, wherein the relevant data segments are data segments that were accessed during an execution of regression tests of a source code or amended during the execution of the regression tests, wherein the executing of the regression tests comprises executing multiple test cases, and (ii) relevant source code segments related to the relevant data segments;
  generating, based on the monitoring results, a first mapping that maps test cases of the multiple test cases to at least some of the relevant data segments;

detecting detected data changes introduced during a monitoring period that follows the execution of the regression tests;

selecting, based on the detected data changes and the first mapping, one or more selected test cases for evaluating an impact of the detected data changes;

evaluating the impact of the detected data changes by executing the one or more selected test cases;

generating the monitoring results by monitoring the executing of the regression tests;

generating, based on the monitoring results, a second mapping that maps the relevant data segments to the relevant source code segments; and generating, based on the second mapping, a third mapping that maps the relevant data segments to test cases.

2. The method according to claim 1 further comprising generating the first mapping based on the third mapping.

3. The method according to claim 1 further comprising amending the source code to introduce data access monitoring hooks.

4. The method according to claim 1 further comprising finding test case candidates based on the detected data changes and the first mapping; and wherein the one or more selected test cases belong to the test case candidates.

5. The method according to claim 4 further comprising filtering the candidate test cases.

6. A method for adaptive regression testing, the method comprises:

generating or receiving monitoring results that are indicative of: (i) relevant data segments, wherein the relevant data segments are data segments that were accessed during an execution of regression tests of a source code or amended during the execution of the regression tests, wherein the executing of the regression tests comprises executing multiple test cases, and (ii) relevant source code segments related to the relevant data segments;

generating, based on the monitoring results, a first mapping that maps test cases of the multiple test cases to at least some of the relevant data segments;

detecting detected data changes introduced during a monitoring period that follows the execution of the regression tests;

selecting, based on the detected data changes and the first mapping, one or more selected test cases for evaluating an impact of the detected data changes;

evaluating the impact of the detected data changes by executing the one or more selected test cases;

generating the monitoring results by monitoring the executing of the regression tests; and clustering the candidate test cases to provide clusters and selecting, for at least cluster, only some of candidate test cases of the cluster.

7. The method according to claim 6 further comprising clustering the candidate test cases based on use cases associated with the test cases.

8. The method according to claim 6 further comprising clustering the candidate test cases based on names of the candidate test case.

9. The method according to claim 6 further comprising clustering the candidate test cases based on code similarity of the candidate test case.

10. A non-transitory computer readable medium that stores instructions for:

generating or receiving monitoring results that are indicative of: (i) relevant data segments, wherein the relevant data segments are data segments that were accessed during an execution of regression tests of a source code or amended during the execution of the regression tests, wherein the executing of the regression tests comprises executing multiple test cases, and (ii) relevant source code segments related to the relevant data segments;

generating, based on the monitoring results, a first mapping that maps test cases of the multiple test cases to at least some of the relevant data segments;

detecting detected data changes introduced during a monitoring period that follows the execution of the regression tests;

selecting, based on the detected data changes and the first mapping, one or more selected test cases for evaluating an impact of the detected data changes;

evaluating the impact of the detected data changes by executing the one or more selected test cases;

generating the monitoring results by monitoring the executing of the regression tests;

generating, based on the monitoring results, a second mapping that maps the relevant data segments to the relevant source code segments; and generating, based on the second mapping, a third mapping that maps the relevant data segments to the test cases.

11. The non-transitory computer readable medium according to claim 10 wherein the instructions stored further comprise instructions for generating the first mapping based on the third mapping.

12. A computerized system that comprises:

a memory module that is configured to receive monitoring results that are indicative of: (i) relevant data segments, wherein the relevant data segments are data segments that were accessed during an execution of regression tests of a source code or amended during the execution of the regression tests, wherein the executing of the regression tests comprises executing multiple test cases, and (ii) relevant source code segments related to the relevant data segments;

a controller that is configured to generate, based on the monitoring results, a first mapping that maps test cases of the multiple test cases to at least some of the relevant data segments;

a monitor that also configured to detect detected data changes introduced during a monitoring period that follows the execution of the regression tests;

a regression test selection engine that is configured to selecting, based on the detected data changes and the first mapping, one or more selected test cases for evaluating an impact of the detected data changes; and wherein the controller is further configured to:

evaluate the impact of the detected data changes based on an execution of the one or more selected test cases;

generate the monitoring results by monitoring the executing of the regression tests;

generate, based on the monitoring results, a second mapping that maps the relevant data segments to the relevant source code segments; and generate, based on the second mapping, a third mapping that maps the relevant data segments to the test cases.

* * * * *